July 16, 1940.　　　F. P. GRUTZNER　　　2,208,157
SYSTEM FOR RECOVERING AND UTILIZING WASTE HEAT
Filed July 31, 1937　　　3 Sheets-Sheet 1

INVENTOR.
FRITZ PAUL GRUTZNER
BY
ATTORNEY.

Patented July 16, 1940

2,208,157

UNITED STATES PATENT OFFICE 2,208,157

SYSTEM FOR RECOVERING AND UTILIZING WASTE HEAT

Fritz Paul Grutzner, Beloit, Wis., assignor to Fairbanks, Morse & Co., Chicago, Ill., a corporation of Illinois Application July 31, 1937, Serial No. 156,652

11 Claims. (Cl. 237—12.1)

This invention relates to systems for recovering and utilizing waste heat from internal combustion engines, and more particularly to improved methods of and means for recovering and utilizing heat from the exhaust discharge, and cooling system of an internal combustion engine.

This invention is well adapted for application in buildings, ships, and similar structures where there is a demand for power, space heating and hot service water. The subject matter of this application is a continuation in part of my copending application for Heating and ventilating systems, bearing Serial No. 85,272, filed June 15, 1936.

In accordance with the foregoing, the principal purpose of the invention is to provide a system for recovering waste heat produced in the operation of an internal combustion engine and for utilizing the heat recovered, as for the heating of service water.

Among other objects may be noted the provision of a system which is positive and automatic in its function to attain the purposes of the foregoing object, and one which is operable independently of power demands on the engine; the system including, also, mechanism of thermostatically controlled type, operable to regulate the temperature of the engine jacket water and that of the hot service water, particularly with respect to maximum temperature limits thereof.

A further object is to provide a system for the purpose described, in which the elements comprising the system are so arranged as to attain a markedly improved and a more efficient system of waste heat-recovery from an internal combustion engine.

Figure 1:
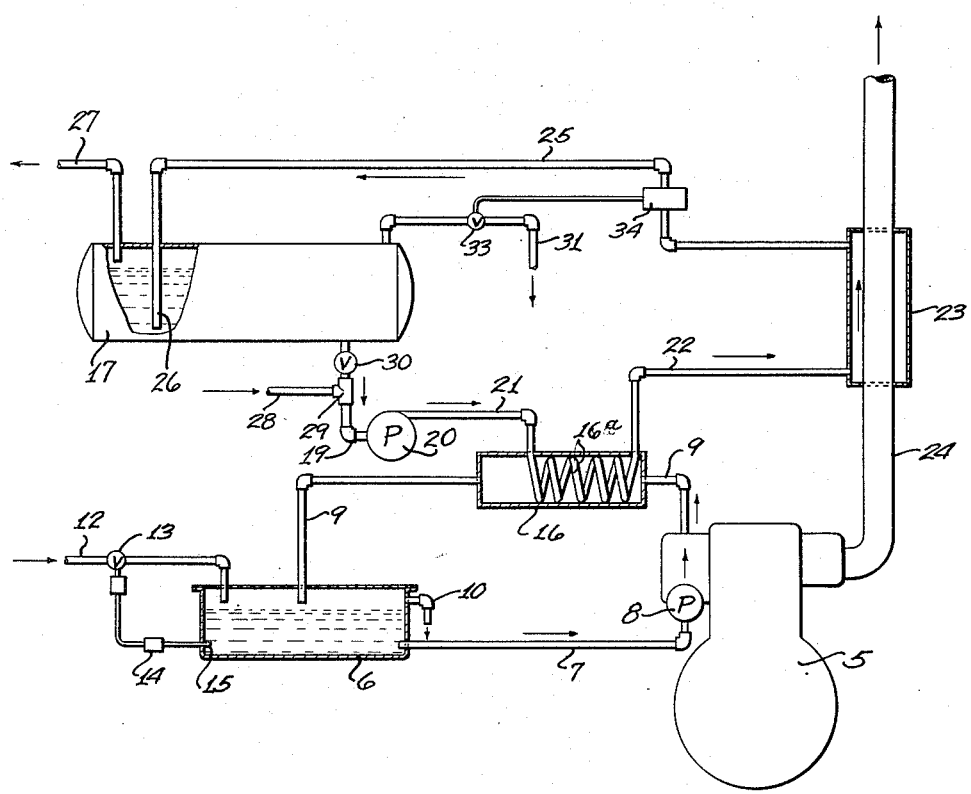
Figure 2:
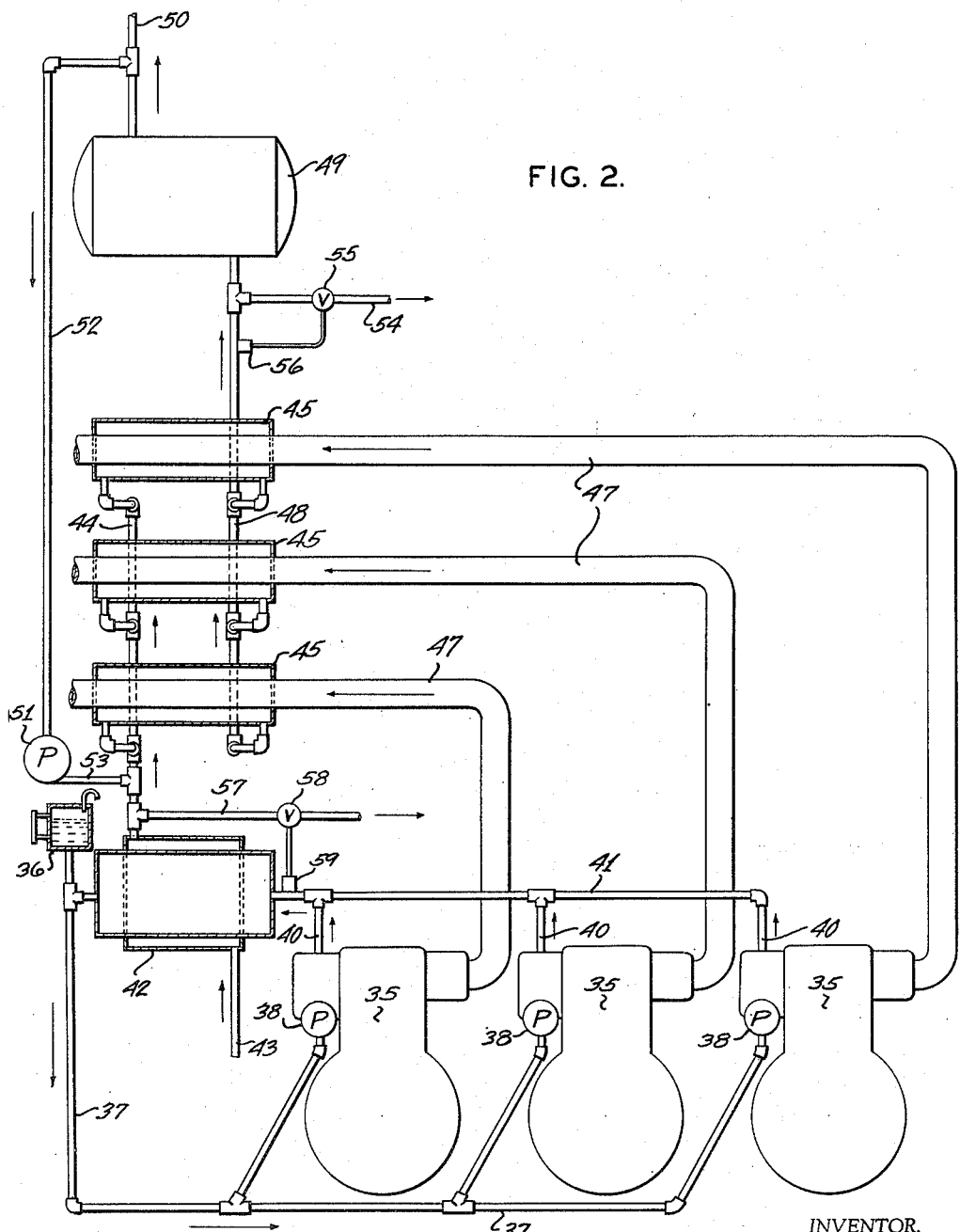
Figure 3:
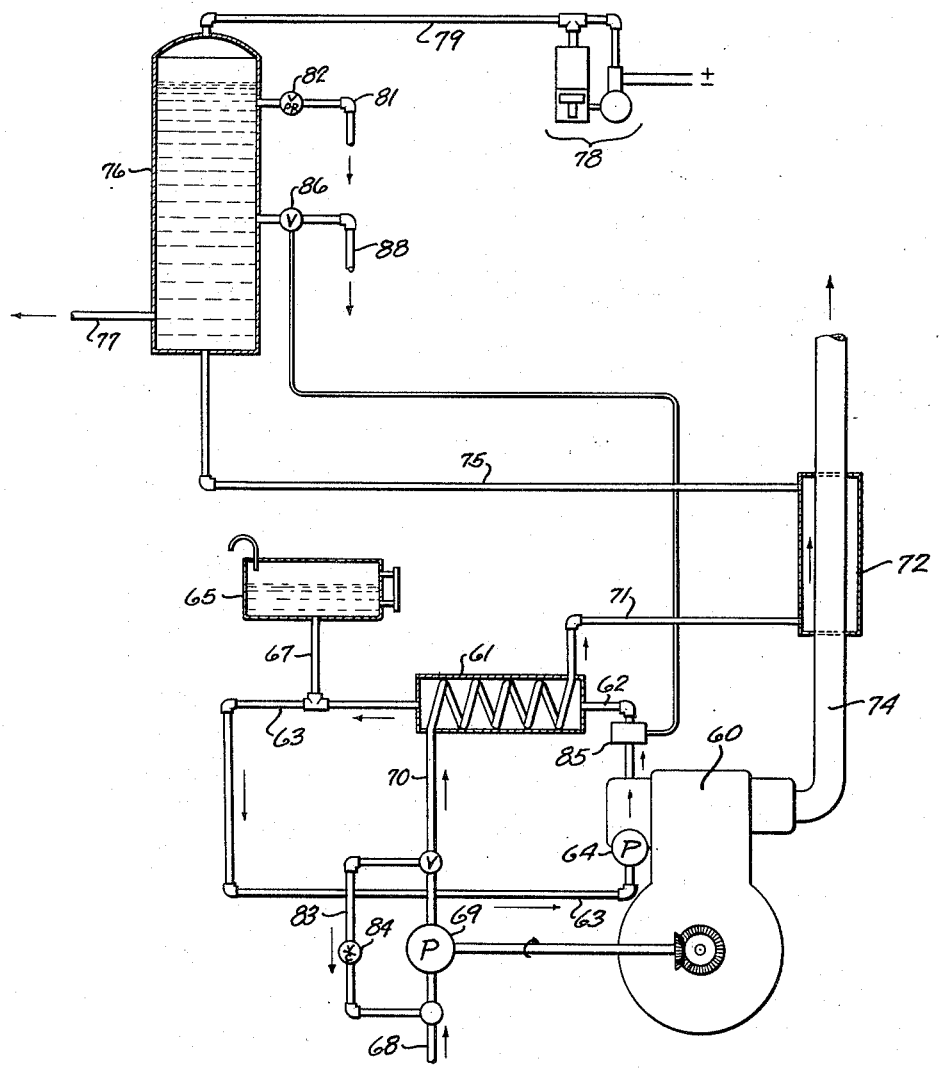

Numerous other objects and advantages of the system will appear from the description, and from the drawings wherein:

Fig. 1 is a diagrammatic illustration of one embodiment of the invention; Fig. 2 is a diagrammatic illustration of a modified system of the type shown by Fig. 1, and Fig. 3 is a diagrammatic illustration of a further modified form of the system.

Referring now to the drawings, and more particularly to Fig. 1 thereof which illustrates one form of the invention, 5 designates generally, an internal combustion engine preferably of Diesel type. The engine may be used to drive any desired apparatus requiring motive power, or may be coupled to an electric generator (not shown) for supplying electric power. The engine structure includes a fluid jacket through which is circulated a cooling fluid, preferably soft water.

The circulating system for the jacket includes a storage receiver or hot well 6, a delivery conduit 7 connecting the well to the engine jacket through a pump 8 which may be driven from the engine, and a return conduit 9 connecting the jacket outlet with the hot well. A hot well overflow connection 10 is provided for a purpose later appearing, the overflow serving also, to maintain substantially atmospheric pressure within the hot well. Make-up water for the jacket cooling system is obtained through a conduit 12 connecting the hot well with a source of soft water (not shown). Delivery of make-up water to the hot well is controlled by a valve 13 in conduit 12, the valve being automaticaly operated by a thermostatic device 14 which in the present example, is preferably of well known Sylphon type, having its temperature responsive element 15 extended into the lower portion of the hot well, as shown. Thus, the thermostat functions to control the valve 13 responsive to temperature conditions of the cooling fluid. The jacket water cooling system which, as will be observed, is of the closed circulatory type, includes a heat exchanger 16 having a coil 16a therein arranged in circuit with the return conduit 9. The cooling water passing through the engine jacket, enters the return conduit 9, say for example, at about 180 degrees F., and then flows through the coil 16a in the heat exchanger 16 wherein it is cooled to about 170 degrees F. by cold service water circulated through the heat exchanger, as will be later described. Thus the cooling water is returned to the hot well at about 170 degrees F., during normal operation of the system. As a means for maintaining the temperature of the water in the well, and hence that of the water delivered to the engine jacket, below a predetermined value, say 172 degrees F., the thermostat 14 is regulated so that it will operate to open valve 13 when the temperature of the water in the hot well exceeds the limit of 172 degrees F. This permits cold water to flow from the make-up supply to the hot well, thus cooling the water therein so as to reduce the temperature thereof below the 172 degree limit. The flow of cold, make-up water to the well may continue until the temperature of the water in the well has been reduced to or below the set limit, at which time the thermostat will operate to close valve 13. Also, an extended inflow of make-up water will fill the hot well, the exces water flowing out through the overflow 10. In this manner, the temperature of the water entering the engine jacket is controlled and maintained below the predetermined maximum, and this in turn tends to maintain at a substantially constant value, 180 degrees F. in the present example, the temperature of the cooling water leaving the engine jacket. In any event, it is to be understood that the limit of 172 degrees herein noted, is determined, say for winter operation of the engine, and that during summer or other seasonal operation of the engine, the temperature limit may be set at some other value. It is to be noted also, that the inlet and outlet temperatures of the cooling water circulated through the engine jackets, will vary according to the type of engine used, its installation in high or low altitudes, and other factors which need not be here enumerated. Hence, the herein noted inlet and outlet temperatures of 170 degrees and 180 degrees respectively, are given by way of example only.

The hot service water system which is by preference a closed circuit in the example of Fig. 1, includes a hot water storage tank or receiver 17. Connected to the bottom of the tank is a conduit 19 which extends to the intake of a circulation pump 20. A conduit 21 extends from the pump discharge outlet to the heat-exchanger 16, and from the exchanger a conduit 22 extends to an exhaust heat-exchanger 23 functionally associated with an exhaust discharge conduit 24 for the engine 5. The outlet of heat-exchanger 23 is, in turn, connected with the receiver 17 by a conduit 25, the end portion 26 of this conduit which enters the tank 17 being extended to a point substantially near the bottom of the tank, as shown in Fig. 1. Hot water is drawn from the tank for consumption, through an outlet pipe 27.

Cold water is supplied to the hot water system from a suitable source of supply, such as a city water main (not shown), through a pipe 28 which is connected to the conduit 19 as by a T-connection 29. The pressure of the water in the city main may vary in different localities, but in the present example, this pressure may be assumed as about 60 pounds. Located in conduit 19 between the tank and the T-connection 29, is a one-way or check valve 30 permitting flow of water from the tank through conduit 19 to the pump 20, but preventing a flow of cold water directly into the tank through conduit 19. While it is preferred to utilize the one-way valve 30 in the system, this valve may be omitted, if desired, as the suction created by the pump 20 will tend to prevent, under normal operating conditions of the system, a direct flow of water from the supply into the tank.

From the foregoing, it will be observed that the circulation of water in the hot-water system, as maintained by the pump 20, is as shown by the arrows (Fig. 1), from the tank 17 through conduit 19, pump 20, engine jacket water heat-exchanger 16, conduit 22, exhaust heat-exchanger 23, and thence back to the tank 17 through the return conduit 25. The water thus circulated, is heated in each of the heat-exchangers 16 and 23, and thereby provides a supply of hot water in tank 17.

In the operation of the system, when the engine is running and no water is drawn from tank 17, the water in the service system circulates in the closed circuit above described. Moreover, as long as the tank is substantially full, there will be no inflow to the system, of cold, make-up water from the city main through pipe 28, as the pressure in the system attains a value approximately equal to the city main pressure of 60 pounds, this being sufficient to prevent such inflow. In the present instance, as the water continues to circulate through the heat-exchangers, it may become heated to an undesirably high degree, and may even approach the boiling point, if no withdrawal of water from the tank 17 occurs during a relatively long period of time. Accordingly, as a means for preventing undesirably high temperatures of the service water, the tank 17 may be provided with an overflow connection 31 extending from the upper portion of the tank, the connection including a valve 33, which during normal operation of the system, remains closed. Valve 33 operates automatically, by a thermostatic device 34 which is suitably associated with the return pipe or conduit 25 so as to be responsive to the temperature of the water in such pipe. The thermostat may be of Sylphon type, and is regulated to effect an opening of valve 33 when the temperature of the service water in pipe 25 exceeds a predetermined value, say 162 degrees F. Opening of valve 33 tends to reduce the pressure in the tank 17 and hence in the circulating system, so that cold water may enter the system from the city main. Addition of cold water tends to increase the volume of water circulating in the system, so that hot water in excess of the capacity of tank 17 will be discharged through the overflow connection 31. Thus the inflow of cold water and discharge of hot water will effect a reduction in the temperature of the service water to or below 162 degrees F., whereupon the thermostat 34 will operate to close valve 33.

Withdrawal of water from the tank to consumption through the outlet pipe 27, reduces the pressure and volume of the water circulating in the system, the pressure drop permitting an inflow of cold water from the supply or city main in an amount equivalent to the service withdrawal. In this manner, the pressure and volume of water circulating in the system may be maintained substantially constant under all operating conditions. It is to be noted, however, that the temperature of the service water may vary under different conditions of engine operation and service demand for hot water, but in any event, the maximum temperature of the service water is limited to a predetermined value, as 162 degrees F. in the present example.

From the foregoing, it will be observed that the service water, while passing through the heat-exchanger 16, absorbs heat supplied from the engine jacket water. It is understood, of course, that separate passages in the heat exchanger 16 are provided for the jacket water and the service water, as the coil 16a through which passes the jacket water, and the space within the exchanger and about the coil, through which flows the service water, and that the heat transfer occurs solely by conduction through the walls of the coil. In this manner then, the heat-exchanger serves both to cool the engine jacket water and to heat the service water. Also, as described, the maximum temperature of the water in the engine jacket system and that in the service system, are automatically controlled and limited to suit the respective requirement of each system. It may be noted in this connection that since the service water temperature is limited to a maximum of 162 degrees F., the thermostat 14 controlling the valve 13 in the jacket water system may be omitted, provided the heat-exchange capacity of the jacket water heat-exchanger system 16 is such as to cool the jacket water to or below 172 degrees F., when the engine 10 is operating at maximum capacity and under a sustained load.

However, to assure a positive maximum temperature control of the jacket water in the hot well 6, it is preferred to utilize the thermostat 14 in the manner described.

In the event of a service demand for a continuous flow of hot water over an extended period of time, the normal thermal-exchange capacity of the heat-exchangers 16 and 23 may be exceeded, so that the temperature of the water delivered to the tank 17 and flowing to consumption may be reduced considerably below the maximum limit of 162 degrees F. But the capacities of the storage tank and the heat exchangers, together with the circulating capacity of pump 20, may be predetermined for a given installation of the system, so that in the event of such a sustained demand for hot water, the temperature thereof will not drop appreciably below say about 100 degrees F.

In Fig. 2 is illustrated, diagrammatically, a modified system of the type shown by Figure 1, the system being applied to a plurality of internal combustion engines 35. Three such engines preferably of Diesel type, are shown in the present example, although any suitable number may be used, depending upon the power requirements of the particular installation. The engines are cooled by a jacket cooling system of a closed-circuit type, the circuit including an expansion tank 36 for make-up water and a conduit or header pipe 37 extending from the tank to engine-driven pumps 38 associated with the jacket spaces of the engines 35. A pipe 40 is connected to the jacket outlet of each engine and to an outlet header 41 in the manner shown, the header 41 being extended for connection to the header 37. Associated with header 41 and in circuit therewith is a heat-exchanger 42, provided for a purpose presently to appear. It will be observed that the engine jackets and pumps are connected in parallel, between the headers 37 and 41, and that the jacket cooling water is circulated by the pumps in a closed circuit including the heat-exchanger 42. The heat-exchanger 42 which may be similar to the heat-exchanger 16 shown in Fig. 1, serves to heat service water circulated in a service water circuit now to be described, and in so doing, to cool the engine jacket water.

Cold service water from a suitable supply, such as a city water main (not shown), is conducted through pipe 43 to the heat-exchanger 42 wherein it is circulated in thermal relation to the jacket water flowing therethrough. The service water passing through the heat-exchanger, flows through a header 44 to individual exhaust heat-exchangers 45, one being thermally associated with the exhaust conduit 47 of each engine. A header 48 connects the service water outlet of each exhaust heat-exchanger and conducts the service water therefrom to a hot water storage tank or receiver 49. From the tank, the hot service water is conducted to consumption through a conduit 50. A forced circulation of the service water in the system may be maintained by a suitable pump 51, the inlet of which is connected to the tank outlet pipe 50 through pipe 52, and the pump outlet or discharge connected as by pipe 53, to the header 44, preferably adjacent the heat-exchanger 42. Thus a closed service water circulation system is attained, the closed circuit including the tank 49, pump 51 and the several exhaust heaters 45.

Once a circulation of service water in the closed system is established, the storage tank 49 remains substantially filled at all times during normal operation of the system, and this condition is maintained even though frequent service demands for hot water are made upon the tank 49. When there is no withdrawal of hot water to service consumption, the pump 51 circulates the water in the closed system described, and during this time, there is substantially no inflow from the source of cold, makeup water, as the pressure in the closed system about equals the pressure of the source. However, in the event of a service withdrawal from tank 49, the pressure in the system is reduced, thus permitting a flow of cold water through heat-exchanger 42 and into the circulating system, in an amount equivalent to the volume of hot water withdrawn.

In those instances where there may be little or no service withdrawal of hot water from tank 49, the service water circulated by the pump 51 through the tank and the several exhaust heat-exchangers 45, may become heated to an undesirably high temperature. Moreover, should the engines be operating under sustained, heavy loads, the heating of the service water by the exhaust heat-exchangers may be sufficient to cause the water to boil. Accordingly, it is most desirable to limit the maximum temperature of the service water to a reasonable value.

In attaining this end, there is provided a waste-discharge pipe 54 which is connected to the header 48 at a point near the connection of the header to the storage tank 49. A control valve 55 is associated with the discharge pipe 54, the operation of the valve being effected automatically by a thermostatic device 56 which is functionally associated with the header 48 so as to operate in response to the temperature of the service water in the header. The valve and thermostat arrangement may be of Sylphon type, with the thermostat regulated so that it will effect an opening of the valve when the service water temperature exceeds, say 170 degrees F. Opening of valve 55 permits a discharge of service water to waste, through pipe 54, and this in turn, results in an inflow to the service system, of water from the city main, as through pipe 43. The resultant flow of fresh water through the system to waste discharge, effects a reduction in the temperature of the service water to or below the maximum limit of 170 degrees F. When the temperature of the service water falls below the maximum setting of thermostat 56, the thermostat effects a closure of valve 55 to restore the system to normal condition.

The temperature of the cooling water entering the engine jackets is controlled so that it will not exceed a predetermined maximum of say 170 degrees F., the selection of the limiting temperature being determined at one value for operation of the engine during cold or winter months, and at another value during the hot or summer months, as heretofore pointed out. A maximum temperature limitation of the water entering the engine jackets, tends to limit the maximum temperature of the water leaving the engine jackets, under conditions of normal engine operation. Of course, greater loading of the engine will tend to increase the jacket exit temperature of the water, due to the greater heating of the engine parts during operation under heavy loading. However, for the purpose of the present example, with the temperature of the water delivered to the engine jackets limited to 170 degrees F., the outlet temperature of the jacket water may be about 180 degrees F. Thus it is to be noted that a rise in temperature of the water leaving the engine jackets, to a degree greater than 180 degrees F., will indicate that the temperature of the water entering the jackets is above the desired limit of 170 degrees F. Accordingly, this outlet temperature may be utilized to effect, through means now to be described, a control of the jacket water inlet temperature so that it will not exceed 170 degrees F.

A pipe or conduit 57 is connected to the service water pipe or header 44, between the jacket water heat-exchanger 42 and the exhaust heat-exchangers 45. This pipe leads to a suitable point of waste-discharge, so that under certain conditions, water from the city main may flow through the heat-exchanger 42 and thence through pipe 57 to waste. A valve 58 is included in the pipe 57, and is automatically controlled by a thermostatic device 59 which is functionally associated with the jacket water header 41 so as to be responsive to the jacket outlet temperature of the engine cooling water. The thermostatic device 59 is preferably of Sylphon type, operating directly upon the valve 58 in a manner to open the valve when the temperature of the jacket water in header 41 exceeds the desired limit of say 180 degrees F. Opening of valve 58 permits a flow of service water from the city main through pipe 43, heat-exchanger 42, header 44 and pipe 57 to discharge. The increased flow of cold service water through the jacket water heat-exchanger 42 effectively cools the jacket water, so as to reduce the temperature of the water entering the engine jackets to or below the desired maximum limit of 170 degrees F. It is to be noted that a flow of cold water through heat-exchanger 42 and thence to waste through pipe 57 in response to opening of valve 58, may occur independently of a flow of the service water from heater 42 to the service water system in response to the opening of waste discharge valve 55 or to a withdrawal of hot service water from tank 48 to consumption, and vice versa.

The operation of the modified system as illustrated by Fig. 2, is believed to be evident from the foregoing description. However, it is desired to point out that like the system of Fig. 1, the service water system of Fig. 2 is substantially a constant volume, but variable temperature arrangement, which presents many advantages evident to those skilled in the art to which this invention pertains.

Fig. 3 illustrates diagrammatically, a further embodiment of the invention, relating to a substantially constant temperature, variable volume service water heating arrangement associated with an internal combustion engine 60. Engine 60 is preferably of Diesel type, and is cooled by a closed-circuit jacket system which includes a heat-exchanger 61. The heat-exchanger is in circuit with the engine jacket space through a pipe 62 connected to the jacket outlet, and a return pipe 63 connected to the jacket inlet through a circulation pump 64. The pump 64 in the present example, is preferably driven by the engine 60 in any suitable manner. An expansion tank 65 is connected to the return pipe 63 through a pipe 67, the tank serving also, as a limited source of make-up water for the jacket cooling system. Tank 65 is arranged so as to provide only a slight pressure head for the cooling water circulating in the jacket system, the low pressure in the system serving to minimize leakage at the pipe joints, as well as internally of the engine. The heat-exchanger 61 serves to cool the jacket water by thermal transfer of heat therefrom to service water directed through the exchanger, as will be now described.

Cold service water from a source of supply, such as a city water main (not shown) is conducted by a pipe 68 to the inlet of a pump 69 driven by the engine 60. A pipe 70 connects the pump outlet with the heat-exchanger 61. Thus with the pump 69 in operation, water will be drawn from the city main and delivered to the heat-exchanger, wherein it circulates in thermal relation to the jacket cooling water also circulated therein. From the heat-exchanger 61, the heated service water is conducted by pipe 71 to a second heat-exchanger 72 which is functionally associated with the engine exhaust discharge duct 74, the water being further heated therein and thence conducted by a pipe 75 to the lower or bottom end of a storage receiver or stand-pipe 76. A pipe 77 extends from the bottom portion of tank 76 to points of hot water consumption (not shown).

The hot service water collecting in tank 76 is by preference, maintained under a substantially uniform pressure which may be about equal to the pressure under which the hot water is delivered to the tank by the action of the pump 69. In the present example, a water pressure of 60 pounds may be assumed, and this pressure may be maintained in the tank 76 by supplying to the upper portion thereof, air under a pressure of about 60 pounds. For this purpose, a suitable motor-driven, air compressor unit 78 may be utilized to deliver compressed air at 60 pounds pressure, to the tank through a pipe 79. The compressor unit may be automatically controlled in any well known manner, so that it will operate to deliver compressed air when the pressure in the tank 76 falls to say about 57 pounds, and will cease delivering compressed air when the tank pressure is about 60 pounds. An overflow pipe 81 including an automatically operating safety valve 82, is connected to the upper portion of the tank, provision thereof being made so that in the event the pressure in the tank materially exceeds 60 pounds, the valve 82 will open to vent water and air from the tank, whereby to relieve the excess pressure.

Between the inlet and outlet pump 69 is a by-pass connection 83 which includes an automatic, pressure-operated valve 84. Valve 84 opens when the pressure in tank 76 is about 60 pounds and the pump is attempting to effect a delivery of service water thereto, against such pressure. In this case, the pump will circulate service water about the by-pass, with substantially no delivery to the tank. However, when service water is withdrawn from the tank to consumption, thereby reducing the tank pressure below 60 pounds, the by-pass valve 84 will close so that pump 69 may deliver make-up water to the tank. In the present example, valve 84 may be regulated to close when the back-pressure thereon drops to about 57 pounds.

Under the conditions of no withdrawal of hot water from tank 76 to consumption, and a pressure of about 60 pounds in the tank, service water from the city main will be circulated by pump 69 about by-pass 83. Hence there will be no flow of service water through the heat-exchanger 61. If this condition obtains for an appreciable time, the engine jacket water may heat up to an undesirable degree. Accordingly, the maximum temperature of the jacket water is limited in a manner now to be described.

Suitably associated with the jacket outlet pipe 62 is a thermostatic device 85 which is preferably of Sylphon type. The thermostat is responsive to the temperature of the jacket water leaving the engine jacket, and is arranged to operate a valve 86 controlling waste-discharge of hot water from tank 76, as through a pipe 88 connected to the tank. In the present example, say it is desired to limit the maximum temperature of the jacket water issuing from the engine jackets, to about 170 degrees F. and in so doing, to limit the maximum temperature of the cooling water entering the engine jackets to a desired value below 170 degrees, say 160 degrees F. Accordingly, the thermostat 85 is regulated to effect an opening of valve 86 and thereby to vent hot water from tank 76, when the outlet temperature of the jacket water exceeds 170 degrees F. Venting of the water from tank 76 reduces the pressure therein, so that the pump by-pass valve 84 will close to permit the pump 69 to deliver make-up water to the tank. Thus a positive flow of service water through the heat-exchanger 61 will result. Hence, the jacket water will be cooled in its passage through the heat-exchanger, to restore the jacket inlet and outlet temperatures to or below the predetermined limits above noted. Upon the restoration of the water temperatures in the jacket cooling system, thermostat 84 will effect a closure of venting valve 86. It is to be noted that the above described operation of the thermostat and venting expedient, is independent of service water withdrawal from the tank 76, the described control being particularly advantageous when there is no service demand upon the tank 76 for extended periods of time. It is to be understood from the foregoing, of course, that when relatively frequent service withdrawal of water from tank 76 occurs, there will be a correspondingly frequent flow of cold service water through the jacket water heat-exchanger 61, and this under normal operation of the system, will be sufficient to maintain the jacket water below the predetermined maximum temperature limits.

Since the service water pump 69 is driven by the engine 60, so that the rate of water displacement thereby is substantially proportional to engine speed and hence engine-loading, the heat-exchange rate of the exchanger 61 will be substantially constant under normal operating conditions. For the same reason, the thermal exchange rate of the exhaust heat-exchanger 72 under normal conditions, is substantially constant. Hence, it will be observed that the temperature of the water in tank 76 normally remains fairly constant. Moreover, the maintenance of a constant service water temperature in tank 76 is aided by the action of the thermostatically operated waste-discharge arrangement 85—86, serving to limit the maximum temperature of the jacket water.

The several embodiments of the invention herein described fully attain the foregoing objects, and may be utilized to great advantage, to provide adequate heat say for normal service water heating required by buildings, ships and the like, which have installed therein one or more internal combustion engines. Further, the systems illustrated are automatic in operation, and utilize apparatus readily available.

It is to be understood, of course, that while the several embodiments of the invention herein described, represent preferred arrangements, alterations or modifications in the elements and relative dispositions thereof may be made without departing from the spirit and scope of the invention, as defined by the appended claims.

I claim:

1. In a system of waste heat recovery of the character described, an internal combustion engine provided with an exhaust discharge conduit and a fluid jacket, a fluid circulating system associated with said jacket, a heat transfer element in circuit with said circulating system a second heat transfer element associated with said exhaust conduit, a service water system including a source of service water supply, a storage tank and piping connecting said source to the tank through said heat transfer elements in series, means associated with said service water system tending to limit the temperature of the water therein, and thermostatically controlled means adapted for regulating the temperature of the fluid in said jacket circulating system.

2. In a system of waste heat recovery, the combination of an internal combustion engine provided with a fluid jacket and an exhaust discharge conduit, a fluid circulating system in circuit with said jacket, heat transfer elements independently functionally associated with said circulating system and said exhaust discharge conduit, a service water system associated in heat absorbing relation to said heat transfer elements, and means functionally associated with said service water system and including a control element therefor, thermally responsive to the temperature of the fluid in said jacket circulating system, said means and control element being adapted for regulating the temperature of the fluid in said jacket circulating system.

3. In a waste heat recovery system of the character described, an internal combustion engine provided with an exhaust discharge conduit and a fluid jacket, a low pressure, fluid circulating system for said engine jacket, said system including a heat transfer element, a service water system including a source of service water, a circulation pump and a storage tank, a second heat transfer element thermally associated with said discharge conduit, and means included in said service water system for conducting service water in heat transfer relation to said heat transfer elements in series, and means including a thermally responsive element, adapted for controlling the temperature of the fluid circulating in said jacket system.

4. In a system of heat recovery in combination with an internal combustion engine provided with an exhaust discharge conduit and a water jacket, a low pressure, water circulating system for said engine jacket, said system including a heat-exchanger, means including a thermostatic element responsive directly to jacket water temperature, associated with said jacket system and adapted for limiting the maximum temperature of the water circulated therein, a second heat-exchanger functionally associated with said discharge conduit, a service water system of circulating type including piping in circuit with said heat-exchangers, and means functionally associated with said service water system, tending to limit the temperature of the service water therein.

5. In a system of the type described, an internal combustion engine provided with a fluid jacket and an exhaust discharge conduit, a fluid circulating system in circuit with said jacket, and including a heat transfer element, a second heat transfer element functionally associated with said exhaust discharge conduit, a closed, service water circulating system thermally associated with said heat transfer elements in service, and independent, thermostatically-controlled means operable for limiting the temperature of the service water and the temperature of the fluid circulated through said engine jacket.

6. In a waste heat recovery system in association with an internal combustion engine, said engine being provided with an exhaust discharge conduit and a fluid jacket, a fluid circulating system in circuit with said jacket, and including a heat transfer element, a second heat transfer element functionally associated with said discharge conduit, a closed service water circulating system including a storage tank in series circuit relation to said second heat transfer element, a source of service water supply, means for conducting water from said source through said first heat transfer element and to said closed service water system, a service water by-pass connection between first heat transfer element and said service water system, and means thermally responsive to jacket fluid temperature, for controlling said by-pass connection.

7. A system of waste heat recovery in association with a plurality of internal combustion engines, each provided with an exhaust discharge conduit and a fluid jacket, a closed fluid circulating system for said engine jackets, said system including a heat transfer element, heat transfer elements associated with said discharge conduits, a service water circulating system in circuit with said exhaust conduit heat transfer elements, a source of service water supply, means for conducting service water from said source through said first heat transfer element and to said service water system, and means functionally associated with said service water system, adapted for limiting the maximum temperature of the service water circulated therein.

8. In a heat recovery system of the type described, a plurality of internal combustion engines, each having an exhaust discharge conduit and fluid jacket, fluid circulating means in circuit with said engine jackets and including a heat transfer element, a heat transfer element associated with each of said exhaust discharge conduits, a service water system in circuit with said heat transfer elements, and means in said system, adapted for limiting the maximum temperature of the fluid circulated in said jacket system and of the service water in said service system.

9. In a system of waste heat recovery, in association with an internal combustion engine having an exhaust discharge conduit and a fluid jacket, a fluid circulating system in circuit with said jacket and including a heat transfer element, a second heat transfer element functionally associated with said exhaust discharge conduit, and a service water system including in series, said heat transfer elements and a storage tank, a service water circulating pump and a by-pass therefor, said by-pass comprising a fluid connection including a unidirectional valve, arranged about said pump, operation of said by-pass being responsive to the water-pressure in said service system, and means adapted to maintain a predetermined water pressure in said service storage tank.

10. In a system of waste heat recovery, an internal combustion engine having a fluid jacket, a fluid circulating system in circuit with said jacket and including a heat-exchanger, a service water system including in series, a storage tank and said heat-exchanger, a discharge outlet for said tank, and means responsive to temperature conditions of the fluid circulated through said engine jacket, adapted for controlling discharge of water from the tank through said outlet.

11. In a waste heat recovery system of the character described, an internal combustion engine of jacketed water-cooled type provided with an exhaust discharge conduit, a closed cooling water system associated with the engine jacket, a heat transfer element functionally associated with said jacket system, a second heat transfer element functionally associated with said exhaust conduit, a service water system including means for conducting service water in heat exchange relation to said heat transfer elements, and means including a thermally operated element responsive to temperatures of the water in said jacket cooling system, adapted for varying the rate of conduction of service water in heat transfer relation to the first said heat transfer element, whereby to control the temperature of the water in said jacket cooling system.

FRITZ PAUL GRUTZNER.